United States Patent [19]

Morgan

[11] Patent Number: 5,524,975
[45] Date of Patent: Jun. 11, 1996

[54] METHOD OF HOLDING A PARTIALLY INACCESSIBLE SHAFT FOR ATTACHMENT OF A PART THERETO

[75] Inventor: Donald Morgan, St. Louis County, Mo.

[73] Assignee: Emerson Electric Co., St. Louis, Mo.

[21] Appl. No.: 130,663

[22] Filed: Oct. 1, 1993

[51] Int. Cl.⁶ ...................................................... H02K 7/14
[52] U.S. Cl. ........................... 310/750; 403/324; 403/328
[58] Field of Search ................................. 310/75 R, 75 D, 310/42, 80, 89; 403/324, 328

[56] References Cited

U.S. PATENT DOCUMENTS

| | | | |
|---|---|---|---|
| 3,685,865 | 8/1972 | Young | 287/119 |
| 3,873,863 | 3/1975 | Pew | 310/50 |
| 4,078,589 | 3/1978 | Miller | 144/32 R |
| 4,179,632 | 12/1979 | Harvell | 310/50 |
| 4,274,023 | 6/1981 | Lamprey | 310/83 |
| 4,422,343 | 12/1983 | Falkenbach et al. | 74/16 |

*Primary Examiner*—Steven L. Stephan
*Assistant Examiner*—Michael Wallace
*Attorney, Agent, or Firm*—Polster, Lieder, Woodruff & Lucchesi

[57] ABSTRACT

A dynamoelectric machine has a rotatable shaft which extends through and is exposed in an end shield to secure a part such as an impeller thereto. To secure the shaft against rotation for attachment of the part thereto, the shaft and end shield are provided with axially aligned bores through which a rod may be journaled.

8 Claims, 1 Drawing Sheet

METHOD OF HOLDING A PARTIALLY INACCESSIBLE SHAFT FOR ATTACHMENT OF A PART THERETO

BACKGROUND OF THE INVENTION

This invention relates to dynamoelectric machines, and in particular, to a means and method of securing a customer part, such as an impeller blade, to a shaft of the dynamoelectric machine. While the invention is disclosed in detail with respect to the application to electric motors, those skilled in the art will recognize the wider applicability of the inventive principles disclosed hereinafter.

Electric motors in the form of AC or DC machines, broadly termed dynamoelectric machines, include a shell which houses a stator and a rotor which rotates in a core of the stator. The housing is closed at either end by end shields. The end shields include bearings which support a rotor shaft. The rotor shaft extends axially from either end of the rotor and passes through at least one of the end shields.

Motor manufacturers often provide motors which are incorporated into other products by original equipment manufacturers (OEMs). The OEMs incorporated the motor into the product by attaching the OEM's part, such as an impeller, gear, etc. to the rotor shaft. The shaft, however, is generally not easily accessibly within the end shield and because it rotates, it is difficult to secure the shaft against rotation to secure the part to the shaft. This can be particularly difficult if the motor location with the OEM's product is in a restricted space to begin with, making manual manipulation of the various components difficult.

One method that has been used is to insert a screw driver into the motor structure to make securing the impeller to the shaft easier. However, this may and often does damage the internal components of the motor. Such damage can go undetected until later field failures occur.

SUMMARY OF THE INVENTION

Therefore, one object of this invention is to provide a method of manufacture of a dynamoelectric machine.

Another objective is to provide such a method which facilitates attachment of a part to a shaft of the dynamoelectric machine.

Another object is to provide such a method which reduces the possibility of damage to the dynamoelectric machine in assembly into another product.

Another object of this invention is to provide a low cost method of assembly for an original equipment manufacturer.

These and other objects will become more apparent to those skilled in the art upon a review of the following disclosure and accompanying drawings.

In accordance with the invention generally stated, a motor assembly includes a stator assembly, a rotor assembly including a rotor shaft, and a pair of end shields supporting the rotor shaft. The rotor shaft extends through at least one of the end shields. A customer part is secured to the rotor shaft. To facilitate the securing of the customer part to the shaft, the end shield and shaft are provided with with bores, which, by rotation of the shaft, may be brought into axial alignment. When the bores are brought into axial alignment, a rod is inserted through the end shield and shaft bores to rotationally fix the shaft. By rotationally fixing the shaft, the attachment of the part thereto is greatly enhanced.

DESCRIPTION OF THE PREFERRED EMBODIMENT

Figure 1:
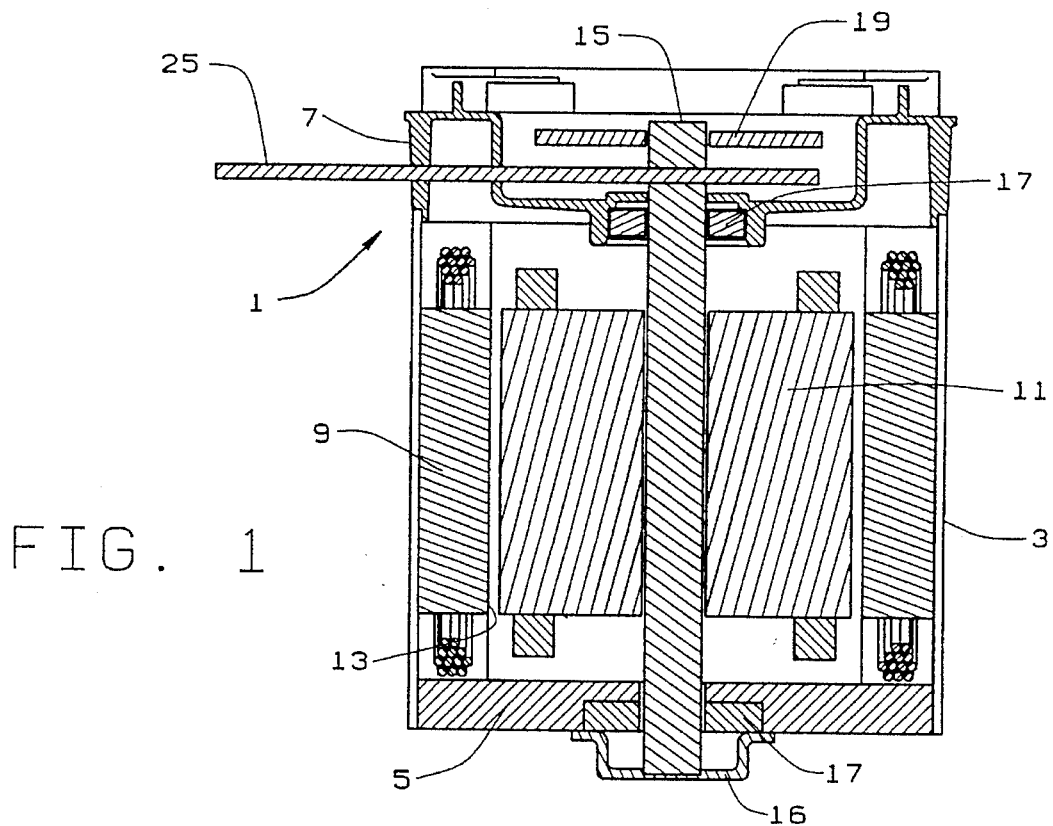
FIG. 1 is a cross-sectional view of a motor assembly.
Figure 2:
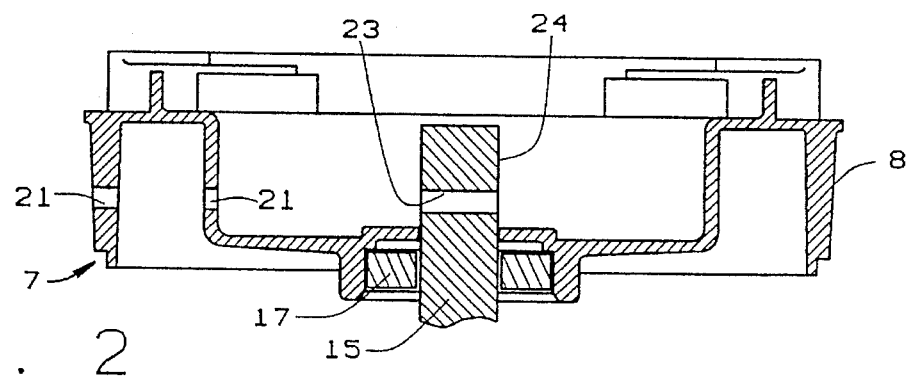
FIG. 2 is an enlarged cross-sectional view of an end shield and rotor shaft of the motor assembly.
Figure 3:
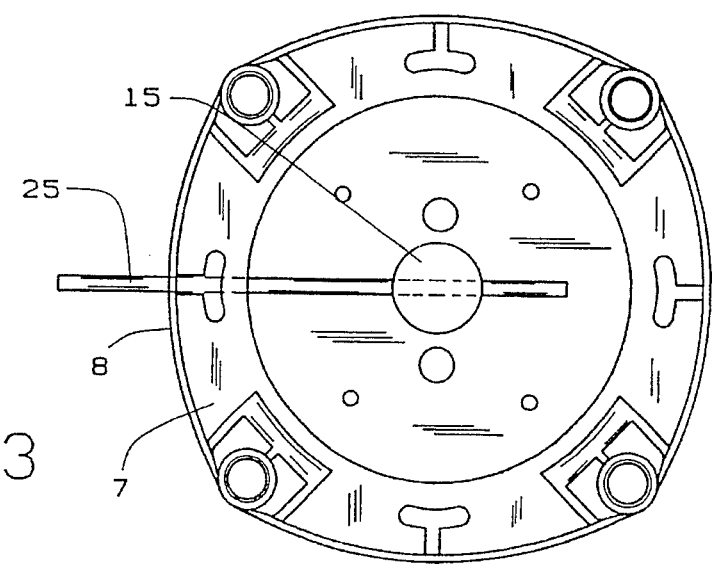
FIG. 3 is a top plan view of the motor assembly showing a rod inserted through the end shield and shaft.

A motor assembly 1 is generally shown in FIG. 1. Motor assembly 1 includes a shell 3 which is closed at one end by a first end shield 5 and is closed at the other end by a second end shield 7. End shield 7 has a circumferential wall 8 which extends outwardly from shell 3. A stator 9 is secured within shell 3. A rotor 11 is positioned within a core 13 of stator 9. A shaft 15 extends axially through rotor 11. The bottom of shaft 15 is rotatably mounted in the first end shield 5 along a bearing assembly 17' which is sealed by a bearing end cap 16. Other bearing arrangements are compatible with the broader aspects of this invention. The other end of the shaft passes through a bearing assembly 17 and through the second end shield 7. The end shields 5 and 7 thus rotatably secure shaft 15 and rotor 11 in shell 3. A part 19, such as a pump impeller for example, is secured to the shaft outwardly of the second end shield 7. It will be appreciated by those skilled in the art that the end shield 7 can and often does form a portion of an OEM's product. In the embodiment illustrated, the end shield 7 is incorporated into a pump structure not shown, of which impeller 19 is a part. Because shaft 15 extends from end shield 7 only a short distance, it is not easily accessible during production of the motor assembly for attachment of the impeller thereto. Further, because it is rotatable, it is difficult to secure the part 19 to the shaft 15. Part 19 is typically threaded onto shaft 15.

To facilitate production of motor assembly 1, a bore 21 is formed in the wall 8 of the second end shield 7. Wall 8 of the illustrated end shield is a double wall. Bore 21 extends through both parts of wall 8. Another bore 23 is formed in shaft 15 in a portion 24 of shaft 15 which extends axially outboardly of the second end shield 7. Bores 21 and 23 are formed on the same horizontal plane. By rotating shaft 15, the bores may be brought into axial alignment. A rod 25 is provided which may be inserted through bores 21 and 23 to rotationally fix shaft 15 during production of motor assembly 1. By preventing rotation of shaft 15, production of the motor assembly is greatly facilitated, allowing faster and easier production of the motor assembly.

To secure part 19 to shaft 15, bores 21 and 23 are brought into axial alignment. Rod 25 is passed through the bores to prevent rotation of shaft 15. Part 19 may then be easily secured to the shaft. Once part 19 is secured to shaft 15, rod 25 is removed. As can be appreciated, this greatly facilitates the production of motor assembly 1 and can enhance the rate at which motor assemblies can be prepared for customers.

The bores 21 and 23 will be the same size for at least each motor of a particular model. Therefore, only one rod 25 is needed for each model. Because rod 25 is only required to prevent rotation of the shaft during attachment of the part to the rotor, the same rod may even be used with a plurality of motor models and sizes.

The foregoing description has been set forth for illustrative purposes only. Variations, within the scope of the appended claims, may be apparent to those skilled in the art. For example, if end shield 7 were a generally planar end shield and wall 8 was defined by a portion of the OEM's product or an end shield cover, no bore would be defined in endshield 7, and rod 25 would be inserted only into bore 23 of shaft 15 to rotationally fix shaft 15. The rod 25 could be provided with a handle to make it easier to hold. The handle could be formed as a grip on the rod, or an extension of the rod which is angled with respect to the longitudinal axis of the rod. These examples are illustrative only.

I claim:

1. A method of attaching a part to a rotatable shaft of a dynamoelectric machine; the dynamoelectric machine comprising a shell housing a stator and rotor, said shaft extending axially from said rotor, a first end shield at least partially closing one end of said shell and a second end shield at least partially closing another end of said shell, said shaft extending through at least one of said end shields so that a part may be secured to said shaft; said shaft having a bore extending therethrough in a portion of said shaft externally of said shell; said method comprising:

passing a rod through said shaft bore to prevent rotation of said shaft, said rod being independent of said dynamoelectric machine, such that said rod can be used to secure a plurality of said parts to a plurality of said dynamoelectric machines;

securing said part to said shaft; and removing said rod from said shaft bore and from said dynamoelectric machine.

2. The method of claim 1 wherein said at least one end shield defines an outwardly extending wall, said end shield having a bore therethrough which may be axially aligned with said shaft bore; said method including rotating said shaft to align said shaft bore with said end shield bore.

3. The method of claim 2 including producing a plurality of assemblies, each assembly including said dynamoelectric machine and said part; said method including journaling said same rod through the bores of each said dynamoelectric machine to prevent rotation of the shaft of said dynamoelectric machine.

4. In combination a dynamoelectric machine and a locking rod separate from said machine, said dynamoelectric machine comprising a shell housing a stator and a rotatable rotor, a rotatable shaft extending axially from said rotor, a first end shield closing one end of said shell and a second end shield closing another end of said shell, said shaft extending through said first end shield, and a part secured to said shaft externally of said end shield; said shaft having a bore extending transversely therethrough in a portion of said shaft externally of said shell; said first end shield having a circumferential wall generally parallel to said shaft, said first end shield wall defining a hole therein which is positioned such that the shaft bore may be axially aligned with said wall hole, said locking rod being removably insertable through said end shield wall opening and into said shaft bore to prevent rotation of said rotor to facilitate attachment of said part to said shaft.

5. The combination of claim 4 wherein said rod has a handle.

6. The combination of claim 5 wherein said handle is a grip.

7. The combination of claim 4 wherein said circumferential wall of said first end shield includes an inner circumferential wall and an outer circumferential wall concentric with said first circumferential wall; said hole extending through both said first and second circumferential walls.

8. A method of producing a plurality of assemblies, each assembly including a dynamoelectric machine having a rotatable shaft and a part secured to said shaft; the dynamoelectric machine comprising a shell housing a stator and a rotor, said shaft extending axially from said rotor, a first end shield at one end of said shell and a second end shield at another end of said shell, said shaft extending through at least one of said end shields so that a part may be secured to said shaft; said shaft having a bore extending through a portion of said shaft externally of said shell, said end shield having a bore therethrough which may be aligned with said shaft bore, said method comprising:

(a) aligning said shaft bore and end shield bore;

(b) passing a rod through said bores to prevent rotation of said shaft;

(d) securing said part to said shaft;

(e) removing said rod from said shaft and end shield bores; and (f) following steps (a)–(e) with said same rod for the production of each said assembly.

* * * * *